UNITED STATES PATENT OFFICE.

WARREN T. MEADE, OF BINGHAMTON, NEW YORK.

FURNITURE-POLISH.

SPECIFICATION forming part of Letters Patent No. 633,022, dated September 12, 1899.

Application filed August 19, 1898. Serial No. 689,006. (No specimens.)

*To all whom it may concern:*

Be it known that I, WARREN T. MEADE, a citizen of the United States, residing at Binghamton, in the State of New York, have invented certain new and useful Improvements in Furniture-Polishes; and I do declare the following to be a full, clear, and exact description of the invention, such as will enable others skilled in the art to which it appertains to make and use the same, reference being had to the accompanying drawing, which forms a part of this specification.

This invention relates to compounds or compositions of matter employed in cleaning the polished, but tarnished, surfaces of pianos and furniture of various kinds; and it consists of a composition or compound comprising the ingredients hereinafter set forth in the quantities named proportionately.

To produce the aforesaid polish in a quantity equal to one gallon, which will serve to illustrate the manner of its production in the quantity desired, the following-named ingredients are employed and in the following manner: I take for one gallon of the improved polish one-half gallon of pure raw linseed-oil, four ounces of grain-alcohol, four ounces of muriatic acid, two ounces of butter of antimony, and in addition to these I employ pure cider-vinegar in a quantity sufficient to make one gallon of the furniture polish or compound. The vinegar used should be of 100° hydrometer test.

Experience in the use of this compound has demonstrated that the compound loosens and removes under proper application grease, smoke-stain, mildew, and other foreign matter that will ordinarily adhere to the surfaces that have not been treated with this compound or may have not been treated at all.

Having thus fully described my invention, what I claim, and desire to secure by Letters Patent, is—

The herein-described compound designed for cleaning and polishing furniture, consisting of raw linseed-oil, grain-alcohol, muriatic acid, butter of antimony, and vinegar, in the proportions substantially as described.

In testimony whereof I affix my signature in presence of two witnesses.

WARREN T. MEADE.

Witnesses:
 GEORGE A. SMITH,
 W. E. ROBERTS.